(12) United States Patent
Chen

(10) Patent No.: US 8,880,995 B2
(45) Date of Patent: Nov. 4, 2014

(54) METHOD AND SYSTEM FOR LOCALIZED SCROLLING TABLE DISPLAY IN A WEBPAGE

(75) Inventor: Qi Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1052 days.

(21) Appl. No.: 12/281,770

(22) PCT Filed: Feb. 1, 2007

(86) PCT No.: PCT/CN2007/000350
§ 371 (c)(1),
(2), (4) Date: Jan. 22, 2009

(87) PCT Pub. No.: WO2007/101390
PCT Pub. Date: Sep. 13, 2007

(65) Prior Publication Data
US 2009/0144607 A1    Jun. 4, 2009

(30) Foreign Application Priority Data

Mar. 6, 2006  (CN) .......................... 2006 1 0056762

(51) Int. Cl.
*G06F 17/00* (2006.01)
*G06F 17/30* (2006.01)
*G06F 17/24* (2006.01)

(52) U.S. Cl.
CPC ........ *G06F 17/245* (2013.01); *G06F 17/30905* (2013.01)
USPC ............ 715/234; 715/217; 715/236; 715/227

(58) Field of Classification Search
USPC .................................. 715/217, 234, 236, 227
See application file for complete search history.

(56) References Cited

U.S. PATENT DOCUMENTS 5,317,306 A * 5/1994 Abraham et al. ............. 345/684
5,970,506 A * 10/1999 Kiyan et al. .................. 715/212
(Continued)

FOREIGN PATENT DOCUMENTS

CN      1434399 A      8/2003
CN     100370454      1/2006
(Continued)

OTHER PUBLICATIONS

Joe Kraynak, Absolute Beginners Guide to Microsoft Office Excel 2003, Sep. 2003, Que, p. 91-92.*
Adding Scrollbar Attribute to Pop Up JavaScript, Sep. 2004, CodingForums.com.*

(Continued)

*Primary Examiner* — Chau Nguyen
*Assistant Examiner* — Howard Cortes
(74) *Attorney, Agent, or Firm* — Lee & Hayes, PLLC

(57) ABSTRACT

The present invention discloses a method for localized scrolling table display in a webpage. The method includes: dividing a table being displayed into at least a 2×2 array of an upper left table, a lower left table, an upper right table and a lower right table; setting the lower left table and the upper right table to hide portions that are beyond display area; and setting the lower right table to hide portions that are beyond the display area and to include a vertical scrollbar and a horizontal scrollbar. The upper right table and the lower right table are controlled by the horizontal scrollbar, and the lower left table and the lower right table are controlled by the vertical scrollbar. The present invention is able to display a table in a webpage with a localized scrolling display and a partial frozen display, and allows unlimited number of data columns and rows in the webpage and still maintains good readability. This satisfies the need for displaying table of a large amount of data for data comparison, and allows the user to conveniently and freely scroll any cell of the table to the display area to be displayed.

5 Claims, 2 Drawing Sheets

(56) References Cited

U.S. PATENT DOCUMENTS

| | | | | |
|---|---|---|---|---|
| 6,313,848 | B1* | 11/2001 | Hoag | 345/684 |
| 6,988,241 | B1* | 1/2006 | Guttman et al. | 715/220 |
| 7,051,119 | B2* | 5/2006 | Shafron et al. | 709/248 |
| 7,587,666 | B2* | 9/2009 | Delvat et al. | 715/227 |
| 2002/0065846 | A1* | 5/2002 | Ogawa et al. | 707/503 |
| 2005/0120293 | A1 | 6/2005 | Benhase et al. | |
| 2006/0005145 | A1* | 1/2006 | Weinlander et al. | 715/786 |
| 2006/0117051 | A1* | 6/2006 | Chin | 707/101 |
| 2007/0168855 | A1* | 7/2007 | Patel et al. | 715/509 |
| 2010/0269031 | A1* | 10/2010 | Buczek | 715/217 |

FOREIGN PATENT DOCUMENTS

| | | |
|---|---|---|
| CN | 101065723 | 10/2007 |
| JP | 2005128744 | 5/2005 |
| JP | 2005353058 | 12/2005 |

OTHER PUBLICATIONS

Huang, "Customizing Display Models of Excel (worksheet)", Journal—China Management Information, Issue 5, May 2000, p. 59.

Translated Chinese Office Action dated Mar. 21, 2008 for Chinese patent application No. 2006100567629, a counterpart foreign application of U.S. Appl. No. 12/281,770, 5 pages.

Dodge, et al., "Microsoft Office Excel 2003 Official Manual, 1st Ed.", Nikkei BP Soft Press, Inc., Jul. 12, 2004, pp. 123-126.

Iwao, "Practical Course for Comfortably Using Spreadsheet Software", Yomiuri PC, vol. 4, No. 4, pp. 34-39, The Yomisuri Shimbun, Mar. 1, 1999.

The Japanese Office Action mailed Mar. 2, 2012 for Japanese patent application No. 2008-557579, a counterpart foreign application of U.S. Appl. No. 12/281,770, 5 pages.

Translated Japanese Office Action mailed Feb. 1, 2013 for Japanese patent application No. 2008-557579, a counterpart foreign application of U.S. Appl. No. 12/281,770, 4 pages.

* cited by examiner

METHOD AND SYSTEM FOR LOCALIZED SCROLLING TABLE DISPLAY IN A WEBPAGE

This application claims priority from Chinese patent application, Application No. 200610056762.9, filed Mar. 6, 2006, entitled "METHOD AND SYSTEM FOR LOCALIZED SCROLLING TABLE DISPLAY IN A WEBPAGE", and incorporates the Chinese patent application in its entirety by reference.

TECHNICAL FIELD

The present invention relates to methods for data processing and displaying, and particularly to a method and system for localized scrolling table display in a webpage.

BACKGROUND ART

As the Internet technology develops, the network resources are becoming richer and richer, and more and more people browse for information on webpages. Today, with technological developments and network advancements, designing a webpage often requires numerous tables to present large quantities of data, and consequently when a data field is very long, the display of a table may be beyond what the computer display screen can display.

With the present webpage designs, when a user browses to this type of a table, the user has to use the dragged scrollbar of the browser to browse. Because of the user habits and issues of the web design technology, the present web browsers nearly never have a horizontal scrollbar. When the data displayed in a table in a webpage has unlimited rows or unlimited columns, for example more than 500 columns, the user will have difficulties to browse such a table. In the field of electronic commerce, tables with unlimited rows and columns are frequently used, and often it is necessary to compare data between different columns. The trading information lists and product information lists of TaoBao.com are examples of such tables.

One solution offered by the present technology is to use divided pages, where each page displays a part of the table information. This method is complicated to use. To compare the data of several columns, the user needs to keep switching back and forth between the pages. This causes low browsing efficiency, requires multiple transmissions of the webpage data, and wastes network resources.

Another solution offered by the present technology is to use embedded tabulation programs. When browsing a table of many rows or columns, the user clicks to call an embedded tabulation program to obtain a relatively satisfying browsing result. An example is disclosed in Chinese patent application No. 02102597.5. Although using embedded tabulation programs may achieve quite satisfying browsing result, the process of calling a tabulation program wastes a great deal of resources for network data transmission and resources of the local computer. Because the complexity of the process to obtain a satisfying browsing effect, the method cannot satisfy the browsing needs of more users, and is further unable to maintain good readability.

Yet another solution offered by the present technology is to set a window on the webpage and embed a table of multiple rows and columns in the window. The user browses the content of the table by scrolling the scrollbar of the window. This method to a certain extent solved the problem of displaying a large table in a small area. However, to perform comparative browsing of the data in the table, the user needs to repetitively drag the scrollbar to find the related data, causing low browsing efficiency.

DESCRIPTION OF THE INVENTION

In view of the above-described problems, the present invention aims to provide a table display method and system that saves network resources and increases user browsing efficiency.

In order to solve the above technical problems, the present invention is implemented using the following technical schemes:

A method for localized scrolling table display in a webpage includes:

dividing a table being displayed into at least a 2×2 array of an upper left table, a lower left table, an upper right table and a lower right table;

setting the lower left table and the upper right table to hide portions that are beyond display area; and setting the lower right table to hide portions that are beyond the display area and to include a vertical scrollbar and a horizontal scrollbar, wherein upper right table and the lower right table are controlled by the horizontal scrollbar, and the lower left table and the lower right table are controlled by the vertical scrollbar.

Preferably, the upper right table and the lower right table are controlled by the horizontal scrollbar as follows: as the horizontal scrollbar scrolls, the upper right table and the lower right table scroll the same horizontal distance on the same horizontal direction; and the lower left table and the lower right table are controlled by the vertical scrollbar as follows: as the vertical scrollbar scrolls, the lower left table and the lower right table scroll the same vertical distance on the same vertical direction.

Preferably, the method for localized scrolling table display in a webpage further includes: setting a frameset including at least two rows and two columns; and embedding the upper left table, the lower left table, the upper right table and the lower right table into the frameset each at a frameset cell corresponding to a respective position to be displayed.

Preferably, the method for localized scrolling table display in a webpage uses a cascading style sheet to set the lower left table, the upper right table and the lower right table.

Preferably, the horizontal scrolling of the upper right table and the lower right table and the vertical scrolling of the law left table and the lower right table are implemented using web scripting.

Preferably, the method further includes displaying the upper left, lower left, upper right and lower right tables in alignment on the webpage according to their respective positions.

A system for localized scrolling table display in a webpage includes:

a table being displayed, including a frozen header, a frozen body, a movable header and a movable body, wherein the frozen header has a width the same as that of the frozen body; the frozen body has a height the same as that of the movable body with portions beyond display area being hidden; the movable header has the height the same as that of the frozen header with portions beyond the display area being hidden; and the movable body has a width the same as that of the movable header with portions beyond display area being hidden, and further includes a vertical scrollbar and a horizontal scrollbar.

The system further includes:

a vertical scrolling subsystem to control the frozen body and the movable body of the table to scroll at the same time vertically; and a horizontal scrolling subsystem used to control the movable header and the movable body of the table to scroll at the same time horizontally.

Preferably, the above-described system for localized scrolling table display in a webpage may use web scripting to realize the vertical scrolling subsystem and the horizontal scrolling subsystem.

Preferably, the system for localized scrolling table display in a webpage may use a cascading style sheet to realize the frozen header, the frozen body, the movable header and the movable body of the table.

Preferably, the system for localized scrolling table display in a webpage further includes a frameset, wherein the frozen header, the frozen body, the movable header and the movable body of the table are embedded into the frameset each at a frameset cell corresponding to a respective position to be displayed.

Based on the above technical schemes, the present invention has the following technical advantages in comparison with the existing technology:

Because the present invention achieves partial scrolling display and partial frozen display of a table in a webpage by using only four HTML (hypertext markup language) tables and two scrolling control systems, it is simple and feasible and does not require embedding other tabulation programs. It saves network data transmission resources and computation resources of the local system.

Because the present invention is able to achieve localized scrolling display and partial frozen display of a table in a webpage, it allows displaying of unlimited number of data rows and columns in the webpage and maintains good readability. This satisfies the need for displaying a table of a large amount of data for data comparison, and allows the user to conveniently and freely scroll any cell of the table to the display area to be displayed. In addition, when there are many (unlimited) columns (or rows), the column width is not restricted, and the readability of the data in the table not affected. The user is not required to repetitively obtain data in the table over the network and to run additional tabulation programs, thus saving the network resources.

DESCRIPTION OF DRAWINGS

In the following, the present invention is explained in further detail using the figures and exemplary embodiments.

EXEMPLARY EMBODIMENTS

The core of the present invention is to divide a webpage table into a frozen display portion and a scrolling display portion that are correlated to each other in their scrolling behavior, based on generating a static table in a webpage and setting the table properties to control the correlated scrolling of the various table portions.

Figure 1:
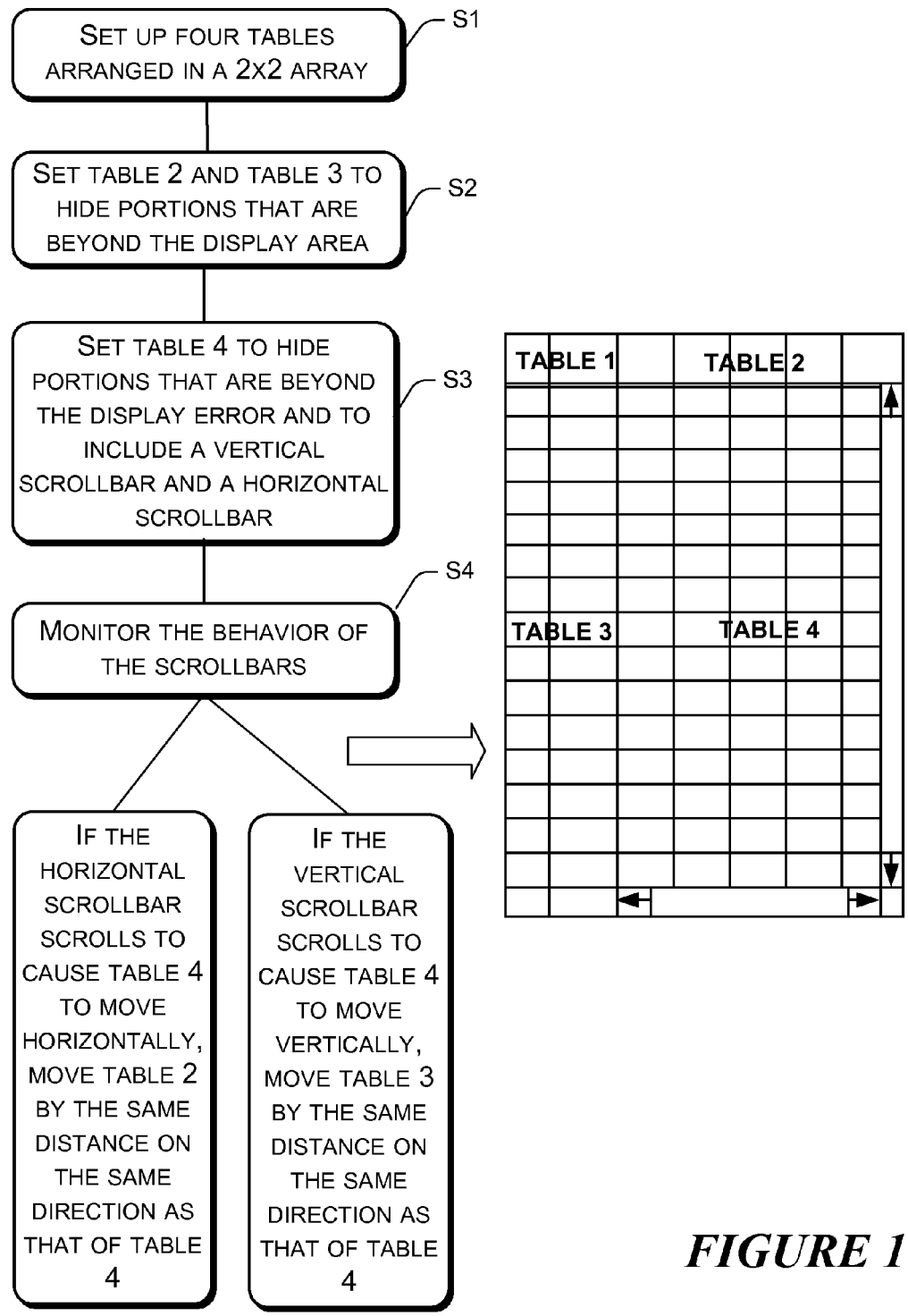
FIG. 1 is a schematic illustration of a process for localized scrolling display of a table in accordance with the present invention.

FIG. 1 is a schematic illustration of a process for localized scrolling display of a table in accordance with the present invention.

Step S1 sets up at least four tables, arranged in a 2×2 (two rows and two columns) array.

These four tables are set up by dividing the table being displayed, and can be viewed as a result of dividing the table being displayed into at least four portions using at least one column dividing line and at least one row dividing line. This way, reviewed in the pre-division table, the upper left table has the same or matching row(s) as the upper right table, and the same or matching column(s) as the lower left table. Likewise, viewed in the pre-division table, the lower right table has the same or matching row(s) as the lower left table, and the same or matching column(s) as the upper right table.

The above-described tables may use static tables generated by available HTML coding. The four tables may be displayed in the webpage according to the alignment of the same 2×2 array corresponding to the position of each table. In general, the widths and heights of the four tables arranged according to a 2×2 array are correlated to each other. In the following, the upper left table is referred to as Table 1, the upper right table as Table 2, the lower left table as Table 3, and the lower right table as Table 4. Among the four tables arranged according to the 2×2 array, the width of Table 1 is the same as the width of Table 3, the height of Table 1 is the same as the height of Table 2, the width of Table 2 is the same as the width of Table 4, and the height of Table 3 is the same as the height of Table 4.

Step S2 sets Table 2 and Table 3 to hide portions of are beyond the display area.

Step S3 sets Table 4 to hide portions that are beyond the display area and to include a vertical scrollbar and a horizontal scroll bar.

The above steps S2 and S3 may use CSS technology to set the properties of the tables. CSS stands for Cascading Style Sheets, and can be used to define all elements in a webpage differently than the default definitions of the browser, and to decide the manner an element in a webpage is to be displayed. CSS is a new W3C ratified attribute auxiliary to HTML design and is able to maintain a unified appearance of the entire HTML. The properties of an overall document, such as color, fonts, etc., may be decided before the designer sets up the document. CSS brings a great deal of flexibility to the design of webpages. Presently, both IE and Netscape browsers support cascading style sheets. Many HTML design software, such as Microsoft's FrontPage 98, support cascading style sheets.

Step S4 monitors the behavior of the scrollbars. If the scrollbar scrolls horizontally, move Table 2 by the same distance on the same direction as that of Table 4. If the scrollbar scrolls horizontally, move Table 3 by the same distance on the same direction as that of Table 4. That is, the horizontal scrollbar controls the scrolling of both Table 2 and Table 4, while the vertical scrollbar controls the scrolling of both Table 3 and Table 4.

In other word, the horizontal scrollbar and the vertical scrollbar together determine the displayed portion of Table 4. A corresponding program can be set up to let Table 3 and Table 4 move on the same vertical direction at the same speed along with the scrolling of the vertical scrollbar, let Table 2 and Table 4 move on the same horizontal direction at the same speed along with the scrolling of the horizontal scrollbar, and thus determine the displayed portions of Table 2 and Table 3. The above scrolling control process can be realized using web scripting technologies, such as JavaScript as described below:

The correlation of the movements between the tables as the scrollbar scrolls is provided by JavaScript language, in which Table 3 is represented by DB, Table 4 is represented by AB, and Table 2 is represented by AH, DB.scrollTop=AB.scrollTop;

AH.scrollLeft=AB.scrollLeft.

JavaScript is a web scripting technology mainly to add interactive actions among the elements in a webpage, for example, letting Table 2 and Table 4 have the same scrolling behavior. To do this, JavaScript monitors Table 4, and upon detecting its horizontal scrolling, lets Table 2 scroll the same distance along the same direction.

It should be noted that, when the display height of Table 1 and Table 2 is shorter than the actual height of these two tables, a vertical scrollbar may be set up in Table 2 to control the vertical scrolling of both Table 1 and Table 2 at the same time. Likewise, the horizontal scrollbar may be set up in Table 3 to control the horizontal scrolling of both Table 1 and Table 3. Furthermore, the table being displayed may be divided into m×n tables. Scrollbars may be set up on some of the tables to accomplish simultaneous scrolling of related tables. The user may set up the division and display of the table being displayed in whatever way according to the needs of the actual application.

A specific example is discussed below. Assume a 10×10 table is needed on a webpage. In the table, the first row is the header, which does not scroll when the second through the 10th rows are scrolling; and the first column and the second column are both fixed and do not scroll when the third through the 10th columns are scrolling. This can be accomplished using the following steps:

First, create a regular 2×2 table, and use CSS to control the sizes of the table and each cell. This method allows very handy control over the corresponding size relations and positional relations among the tables. Of course, one who is skilled in the art may also use other methods to accomplish a 2×2 arrangement of four tables. For example, using any other HTML tags with the help of CSS to define a 2×2 array arrangement, or using webpage frame technology to define a 2×2 array arrangement, are all exemplary ways to realize a scheme of a 2×2 arrangement. The present invention has no restriction in this respect. For the convenience of description, in the following the upper left cell is referred to as cell A, the upper right cell is referred to as cell B, the lower left cell is referred to as cell C, and the lower right cell is referred to as cell D.

Thereafter, place a 1×2 (one row and two columns) regular table, referred to as AT, in cell A. The size of AT is equal to the size of cell A.

Place a 1×8 (one row and eight columns) regular table, referred to as BT, in cell B. The height of BT is equal to the height of cell B. Use CSS to define cell B and let it be able to accommodate BT which may have a greater width (i.e., hide the portion that is beyond the display area).

Place a 9×2 (nine rows and two columns) regular table, referred to as CT, in cell C. The width of CT is equal to the width of cell C. Use CSS to define cell C and let it be able to accommodate CT which may have a greater height (i.e., hide the portion that is beyond the display area).

Place a 9×8 (nine rows and eight columns) regular table, referred to as DT, in cell D. Use CSS to define cell D and let it be able to accommodate DT which may have a greater height and a greater width (i.e., hide the portions that are beyond the display area), and also display two scrollbars.

Finally, install a segment of JavaScript to monitor the scrolling events of cell C and cell D. Upon detecting the occurrence of the scrolling events, execute the following operations:

(1) If the operator uses mouse to drag or uses the rolling wheel of the mouse to scroll cell D, perform the following operations:

a. if it is horizontal scrolling, let cell B scroll the same distance on the same direction;

b. if it is vertical scrolling, let cell C scroll the same distance on the same direction;

(2) If the operator uses the rolling wheel of the mouse to scroll cell C, perform the following operations:

let cell D scroll the same distance on the same direction.

The above example and illustration are for the purpose of realizing partial frozen and partial scrolling display of an unlimited number of columns of a table. Without taking any inventive step, a technician in the field may use the method described in the present invention to realize partial frozen and partial scrolling display of an unlimited number of rows of a table. In fact, the above illustrated example already keeps the first row, the header, relatively fixed. When the other rows are scrolling, this row is stationary, i.e., relatively fixed. Naturally, only slight modifications are needed to achieve partial frozen and partial scrolling display of an arbitrary number of rows of the table. For example, change the first row of the table to the first five rows, then the first five rows of the table can be fixed.

Figure 2:
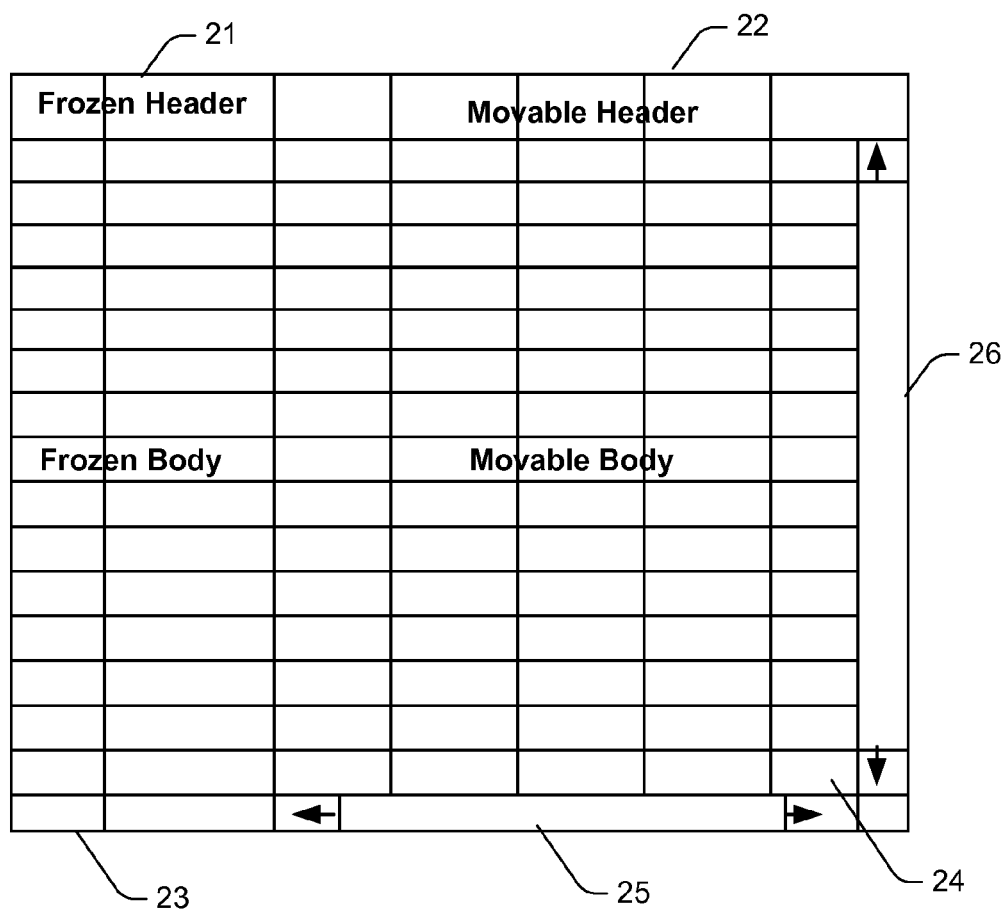
FIG. 2 is a schematic structure illustration of a system for localized scrolling display of a table in accordance with the present invention.

FIG. 2 is a schematic structure illustration of a system for localized scrolling display of a table in accordance with the present invention. The system includes the table being displayed, a subsystem for vertical scrolling and a horizontal scrolling subsystem.

The table being displayed includes a frozen header, a frozen body, a movable header and a movable body, which are described as follows.

Frozen header 21 has a width the same as that of the frozen body.

The frozen body 23 has a height the same as that of the movable body with portions beyond display area being hidden.

The movable header 22 has a height the same as that of the frozen header with portions beyond the display area being hidden.

The movable body 24 has a width the same as that of the movable header with portions beyond display area being hidden and further includes a vertical scrollbar and a horizontal scrollbar.

The vertical scrolling subsystem 26 is used to control the frozen body and the movable body to scroll at the same time vertically.

The horizontal scrolling subsystem 25 is used to control the movable header and the movable body to scroll at the same time horizontally.

The number of cells in frozen header 21 matches the cell data of each row in frozen body 23. A cell in the frozen header 21 may be a generic description of all cell data in a corresponding column of frozen body 23. The number of cells in movable header 22 matches the cell data of each row in movable body 24. A cell in the movable header 22 may be a generic description of all cell data in a corresponding column of movable body 24. Such settings facilitate data comparison in the table.

In the above-described system, frozen header 21 is always stationary. Movable header 22 is always stationary in the vertical direction. Frozen body 23 is always stationary in the horizontal direction. Frozen body 23 and movable body 24 can scroll on the same vertical direction at the same speed. Movable header 22 and movable body 24 can scroll on the same horizontal direction at the same speed. The vertical scrolling of frozen body 23 and movable body 24 is controlled by the vertical scrolling subsystem 26. The horizontal scrolling of movable header 22 and movable body 24 is controlled by the horizontal scrolling subsystem 25.

The vertical scrolling subsystem 26 and the horizontal scrolling subsystem may be implemented using web scripting technology, such as JavaScript.

The frozen header 21, frozen body 23, movable header 22 and the frozen body 24 may be implemented using cascading style sheets.

The above-described system for localized scrolling table display may further include a frameset, in which the frozen header, the frozen body, the movable header and the movable body of the table are each embedded at a frameset cell corresponding to a respective position of the frozen header, the frozen body, the movable header and the movable body. The frameset may conveniently control the size correspondences and positional relationships among the tables, such that the tables are brought together with better integrity. The frameset may use the format of two rows and two columns.

Naturally, using the system for localized scrolling table display described in the present invention, the table being displayed may be divided into more than four components, such that the whole system made up of the components includes multiple parts for frozen display and at the same time multiple parts for scrolling display. This may satisfy more sophisticated table display needs.

In the above system, although movable header 22 does not in itself have a horizontal scrollbar, and frozen body 23 does not in itself have a vertical scrollbar, movable header 22 and frozen body 23 can be scrolled using some other ways to drive movable body 24 to scroll on the same direction by the same distance, because both movable header 22 and frozen body 23 hide the table data beyond the display area. For example, if the movable header 22 scrolls horizontally, movable body 24 scrolls on the same direction by the same distance. If the frozen body 23 scrolls vertically, movable body 24 scrolls on the same direction by the same distance. The said other ways to scroll movable header 22 and frozen body 23 may include: scrolling of movable header 22 and frozen body 23 caused by pressing and dragging the left key of the mouse, and scrolling of frozen body 23 effected by rolling the middle wheel of the mouse, etc.

Information that may have been omitted in the above description of the system for localized scrolling table display may be referenced to in the above description of the method provided by the present invention for localized scrolling table display.

The above has described in detail a method and system for localized scrolling table display in a webpage as provided by the present invention. The present document uses exemplary embodiments to illustrate the principles and implementations of the present invention. It is understood that the above exemplary embodiments are only for the purpose of assisting the understanding of the method and core concept of the present invention. Furthermore, to those of skills in the art, there exist many variations of the exemplary embodiments and applications based on the core of the present invention. For the foregoing reasons, the present description should not be understood as limitations to the present invention.

The invention claimed is:

1. A method of generating locally scrollable tables in a web page, the method comprising:
    dividing a table into at least four sub-tables including an upper left sub-table, a lower left sub-table, an upper right sub-table and a lower right sub-table using Cascading Style Sheets (CSS);
    setting the lower right sub-table, the lower left sub-table and the upper right sub-table to hide portions that are beyond display area;
    embedding the lower right sub-table, the lower left sub-table, the upper right sub-table and the upper left sub-table into a frameset to control size correspondences and positional relationships among the lower right sub-table, the lower left sub-table, the upper right sub-table and the upper left sub-table;
    installing a first segment of a scripting language code to move the upper right sub-table a horizontal distance in a horizontal direction of the lower right sub-table in response to detecting that the lower right sub-table moves; and
    installing a second segment of a scripting language code to move the lower left sub-table a vertical distance in a vertical direction of the lower right sub-table in response to detecting the lower right sub-table moves.

2. The method as recited in claim 1, wherein the setting of the lower right sub-table, the lower left sub-table and the upper right sub-table is controlled by Cascading Style Sheets (CSS).

3. The method as recited in claim 1, further wherein the upper left, lower left, upper right and lower right sub-tables are in alignment with one another.

4. A system of generating locally scrollable tables in a web page, the system comprising:
    memory;
    at least one processor coupled to the memory;
    a table generating component, stored in the memory and executable on the at least one processor, to:
    generate a table including a frozen header, a frozen body, a movable header and a movable body,
    embedding the frozen header, the frozen body, the moveable header and the movable body into a frameset to control size correspondences and positional relationships among the frozen header, the frozen body, the moveable header and the movable body, wherein:
        widths of the frozen header and the frozen body are the same,
        heights of the frozen body and the movable body are the same, the frozen body and the moveable body being set to hide portions beyond display area,
        heights of the movable header and the frozen header are the same, the moveable header being set to hide portions beyond display area, and
        widths of the movable body and the movable header are the same;
    a vertical scrolling component, stored in the memory and executable on the at least one processor, to generate a vertical scrollbar by installing a first segment of a scripting language code to move the frozen body a vertical distance in a vertical direction of the moveable body in response to detecting the moveable body moves; and
    a horizontal scrolling component, stored in the memory and executable on the at least one processor, to generate a horizontal scrollbar by installing a second segment of a scripting language code to move the moveable header a horizontal distance in a horizontal direction of the moveable body in response to detecting that the moveable body moves.

5. The system as recited in claim 4, wherein the generating of the table is controlled at least by Cascading Style Sheets (CSS).

\* \* \* \* \*